Patented Sept. 30, 1952

2,612,524

UNITED STATES PATENT OFFICE 2,612,524

PREPARATION OF KETONES BY DEHYDROCARBOXYLATION OF CARBOXYLIC ACIDS

Albert C. Zettlemoyer, William C. Walker, and William L. Stump, Bethlehem, Pa., assignors to Food Machinery and Chemical Corporation, New York, N. Y., a corporation of Delaware No Drawing. Application December 9, 1948, Serial No. 64,434

10 Claims. (Cl. 260—590)

This invention relates to the production of ketones from carboxylic acids at elevated temperatures in the presence of a catalyst and more particularly to the catalyzation of dehydrocarboxylation reactions by means of certain magnesia compounds hereinafter more fully described.

A number of ketones at the present time are produced commercially in quite satisfactory yields and at reasonable costs, but various specific ketones can only be produced on a commercial scale by processes operating at extremely low efficiency. For example, phenyl acetone has been produced by reacting phenyl acetic acid and acetic acid in the presence of thoria supported on pumice at a temperature of about 440° C. Only 45% conversion of the phenyl acetic acid has been obtainable although the ratio of the reactants has been maintained at 1 to 2 and the space velocity has been limited to 0.2.

The present process is applicable to the production of ketones broadly or to ketones of all types. A specific object, however, is to produce phenyl acetone by a more efficient process than that now employed commercially and generally considered the best method available for commercial operation.

Broadly considered, the process involves dehydrocarboxylating carboxylic acids by heating the acids in the presence of a magnesia having an iodine number in excess of 15 and an ignition loss on heating of from 1 to 20%. In a preferred procedure of the invention, the acid (or the mixture of acids) to be dehydrocarboxylated is vaporized and continuously passed over or through the catalyst in solid condition. Temperatures within the range of 300 to 350° C. are preferred, but in some instances temperatures outside of this range lead to satisfactory results.

The invention is not limited to vapor phase reactions, but it is applicable also to liquid phase reactions, the latter being feasible for acids of very low volatility. When vapor phase reactions are employed, the space velocity may be varied considerably without detrimental effect, but velocities of from 0.1 to 1.0 liter of liquid feed per liter of catalyst per hour generally give desirable results. It is not essential that the reaction be carried out at atmospheric pressure and if necessary to vaporize relatively non-volatile reactants or even volatile reactants the reaction may be carried out under reduced atmospheric pressure. The reaction of solid or relatively non-volatile reactants may in some instances be facilitated by the presence of an inert carrier such as benzene.

Example 1

A mixture of phenyl acetic acid and acetic acid in the mol ratio of 1 to 5 was vaporized, preheated and passed through a reaction zone containing active magnesia having an iodine number of 130 and an ignition loss of 7, at a velocity of 0.36 liter/liter of catalyst/hour. The product obtained was then treated to recover the phenyl acetone by neutralizing any unreacted acid with a solution of sodium bicarbonate and then separating the oil and water layers. The oil layer was then fractionated and the fraction collected between 210° and 230° C., this product being the phenyl acetone. The amount collected represented 70% conversion of the phenyl acetic acid.

The foregoing process was repeated using a different magnesia, namely one having an iodine number of 146 and an ignition loss of 7.2. Substantially the same results were obtained.

Example 2

A mixture of phenyl acetic acid and acetic acid in the mol ratio of 1 to 2 in combination with 3 mols of acetone was vaporized, preheated and passed through a reaction zone containing active magnesia having an iodine number of 130 and an ignition loss of 7, at a velocity of 0.36 liter/liter of catalyst/hour. The product was recovered in the same manner as described in Example 1.

Example 3

A mixture of phenyl acetic acid and acetic acid in the mol ratio of 1 to 2 was vaporized, preheated and passed through a reaction zone containing an active magnesium oxide supported on pumice, the said magnesia having an iodine number of 130 and an ignition loss of 7 and the said gases being passed at a velocity of 0.36 liter/liter of catalyst/hour. The product was recovered in the same manner as described in Example 1. The amount collected represented 54% conversion of the phenyl acetic acid.

The supported catalyst may be satisfactorily obtained by soaking a volume of the pumice or other carrier in an equal volume of magnesium nitrate for a period of 30 minutes with constant agitation. At the end of this period the liquid is decanted and magnesium hydroxide is precipitated on the surface of the carrier by the addition of ammonium hydroxide. The resulting mass is dried at 110° C. and then activated by heating the same in a reactor over night at an elevated temperature of 300–400° C.

in the presence of a slow stream of nitrogen passed over the same.

Example 4

Acetic acid was converted into acetone by passing vapors of the same over magnesia in a zone maintained at about 345° C. at a rate of 40 milliliters per hour, the amount of the magnesia being from 15 to 20 grams. When a relatively inactive magnesia was employed, the conversion was 70% but when a highly active magnesia was employed, the conversion was 99.8%.

Example 5

Adipic acid in the molten state was maintained in contact with magnesia in a mol ratio of 20 to 1 until the reaction had gone substantially to completion. Thereafter the reaction mass was distilled over at a temperature of about 290° C. Thereafter the distillate was refined by redistillation and a fraction was obtained at 128° to 131° C. boiling range composed of cyclopentanone. When an active magnesia (iodine number 50) was employed, the yield was about 82%, whereas when a relatively inactive magnesia (iodine number 4) was employed the yield was only about 66%.

In the foregoing reaction adipic acid anhydride may be employed instead of adipic acid.

Example 6

Acetic acid in gaseous phase was passed over active magnesia at 250° C. and substantially 100% conversion to acetone was obtained.

The active magnesias contemplated by the present invention could be satisfactorily produced by the process of Patent Number 2,219,726 issued to M. Y. Seaton. This patent discloses methods of producing active magnesias of a wide range of iodine numbers and that active magnesias having iodine numbers of 145 and more can be produced by passing a magnesium hydroxide slurry through an inclined rotary kiln countercurrent to hot flame gases and heating the same to a very high temperature of, for example, 781° C. for a brief period of about two and a half minutes or until the desired product is obtained. The active magnesias are described as having a residual magnesium hydroxide content of 80% down to as low as 2%, the amount of which depends upon the conditions of the calcination. Magnesias of an extremely high iodine number suitable for the invention may be prepared by the process of the co-pending application, Serial Number 64,433, filed December 9, 1948, by two of the present applicants, Albert C. Zettlemoyer and William C. Walker, and Walter J. Riley, now U. S. Patent 2,606,816. The method of determining the iodine numbers of the products herein disclosed is defined in the article "Active magnesia," by two of the present applicants, appearing in Ind. Eng. Chem., volume 39, page 69. The ignition loss of such products may be defined as the per cent weight loss obtained by burning a one-gram sample of the active magnesia in a porcelain crucible in a muffle furnace at 1000° C.

It should be understood that the present conversion is not limited to the specific examples of materials herein given but that it extends to all other materials and equivalent conditions which will occur to those skilled in the art upon consideration of the scope of the terms employed in defining the general invention and in the claims appended hereto.

We claim:

1. In the production of ketones from carboxylic acids at elevated temperatures, the improvement which comprises, catalyzing the dehydrocarboxylation reaction by carrying out the same in the presence of an active magnesia being a magnesium oxide-magnesium hydroxide product having an iodine number in excess of 15 and an ignition loss of from 1 to 20% at a temperature below about 350° C.

2. A process for the production of ketones which comprises continuously passing vapors of a carboxylic acid at an elevated temperature below about 350° C. into contact with an active magnesia composed of magnesium oxide and magnesium hydroxide in proportions imparting thereto an iodine number in excess of 15 and an ignition loss of from 1 to 20%.

3. A process for the production of ketones from carboxylic acids at elevated temperatures which comprises passing the carboxylic acids in vapor form through an active magnesia composed of magnesium oxide and magnesium hydroxide in proportions imparting thereto an iodine number of at least 130 and an ignition loss of between 2 and 15% at a temperature below about 350° C.

4. The process of producing ketones from carboxylic acids which comprises continuously passing vapors of at least one carboxylic acid at a temperature of from 300 to 350° C. into contact with an active magnesia composed of magnesium oxide and magnesium hydroxide in proportions imparting thereto an iodine number in excess of 15 and an ignition loss of from 1 to 20%.

5. The process of producing mixed ketones which comprises heating a mixture of carboxylic acids to a temperature of 300 to 350° C. in contact with an active magnesia composed of magnesium oxide and magnesium hydroxide in proportions imparting thereto an iodine number in excess of 15 and an ignition loss of from 1 to 20%.

6. The process of preparing phenyl acetone which comprises passing vapors of phenyl acetic acid and of acetic acid in excess at an elevated temperature of about 300–350° C. over a magnesium oxide-magnesium hydroxide product in proportions imparting an iodine number in excess of 15 and an ignition loss of from 1 to 20%.

7. The process of preparing phenyl acetone which comprises passing vapors of phenyl acetic acid and of acetic acid together with vapors of acetone in contact with an active magnesia composed of magnesium oxide and magnesium hydroxide in proportions imparting thereto an iodine number in excess of 15 and an ignition loss of from 1 to 20% at a temperature below about 350° C.

8. The process of producing phenyl acetone which comprises passing vapors of phenyl acetic acid and of acetic acid in excess at an elevated temperature below about 350° C. over an active magnesia composed of magnesium oxide and magnesium hydroxide in proportions imparting thereto an iodine number in excess of 15 and an ignition loss of from 1 to 20%, the said magnesia being supported on a porous carrier.

9. The process of producing phenyl acetone which comprises passing vapors of phenyl acetic acid and of acetic acid in excess at an elevated temperature below about 350° C. over an active magnesia composed of magnesium oxide and magnesium hydroxide in proportions imparting thereto an iodine number in excess of 15 and an ignition loss of from 1 to 20%, the said magnesia being supported on pumice.

10. The process of producing acetone which comprises passing vapors of acetic acid at a temperature of from 300° to 350° C. in contact with an active magnesia composed of magnesium oxide and magnesium hydroxide in proportions imparting thereto an iodine number in excess of 15 and an ignition loss of from 1 to 20%.

ALBERT C. ZETTLEMOYER.
WILLIAM C. WALKER.
WILLIAM L. STUMP.

REFERENCES CITED

The following references are of record in the file of this patent:

UNITED STATES PATENTS

| Number | Name | Date |
|---|---|---|
| 1,904,495 | Mauger | Apr. 18, 1933 |
| 2,219,726 | Seaton | Oct. 29, 1940 |

FOREIGN PATENTS

| Number | Country | Date |
|---|---|---|
| 494,246 | France | Sept. 3, 1919 |

OTHER REFERENCES

Blatt: "Organic Syntheses," Collective vol. II, pp. 389–91 (1943); John Wiley and Sons, New York.

Curtis et al.: J. Soc. Chem. Ind. (London), vol. 66, pp. 402–07 (1947); abst. in Chem. Absts., vol. 42, col. 3726 (1948).

Zettlemoyer et al.: Ind. Eng. Chem., vol. 39, pp. 69–74 (1947).

"Advances in Catalysis," vol. I, pp. 81–82, edited by Frankenburg et al., copyright 1948 by Academic Press Inc., New York.